No. 838,384. PATENTED DEC. 11, 1906.
A. J. COLLAR.
SYSTEM OF WATER CONTROL.
APPLICATION FILED DEC. 20, 1904.
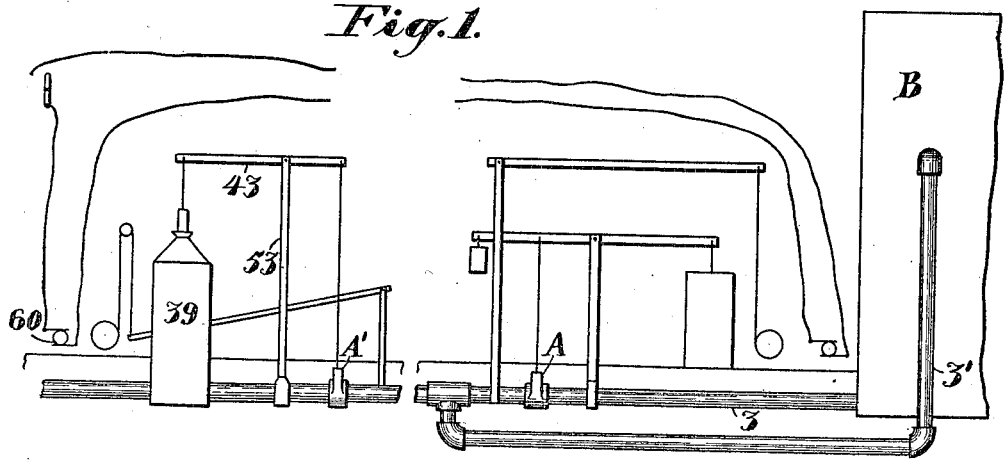
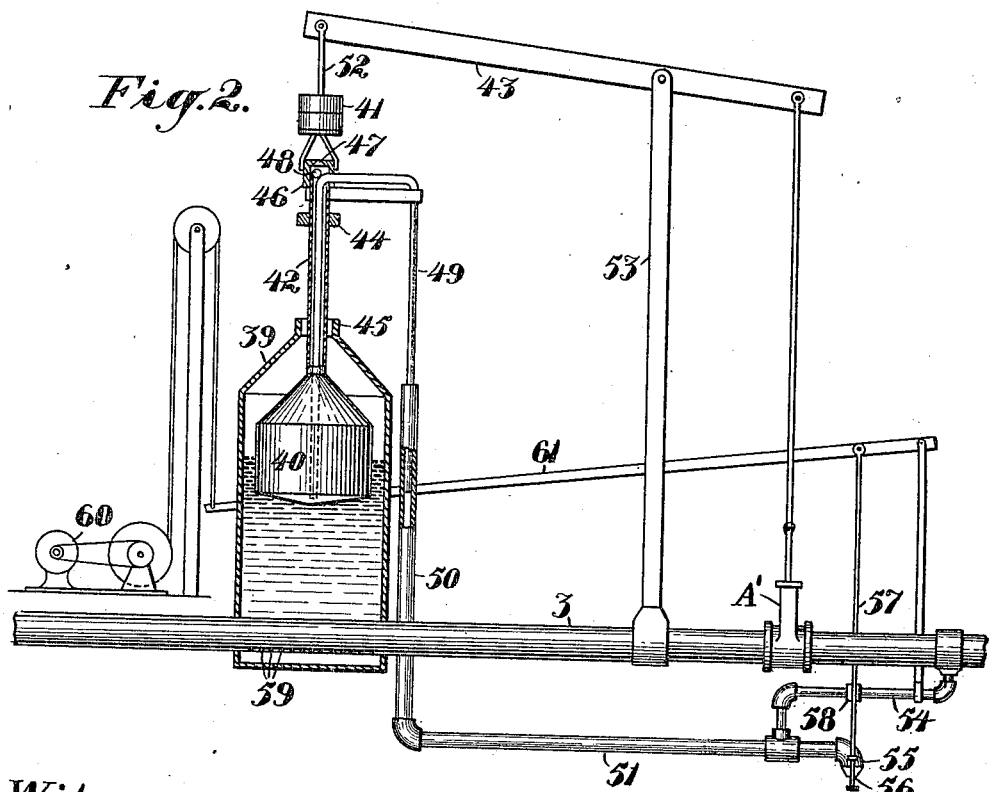

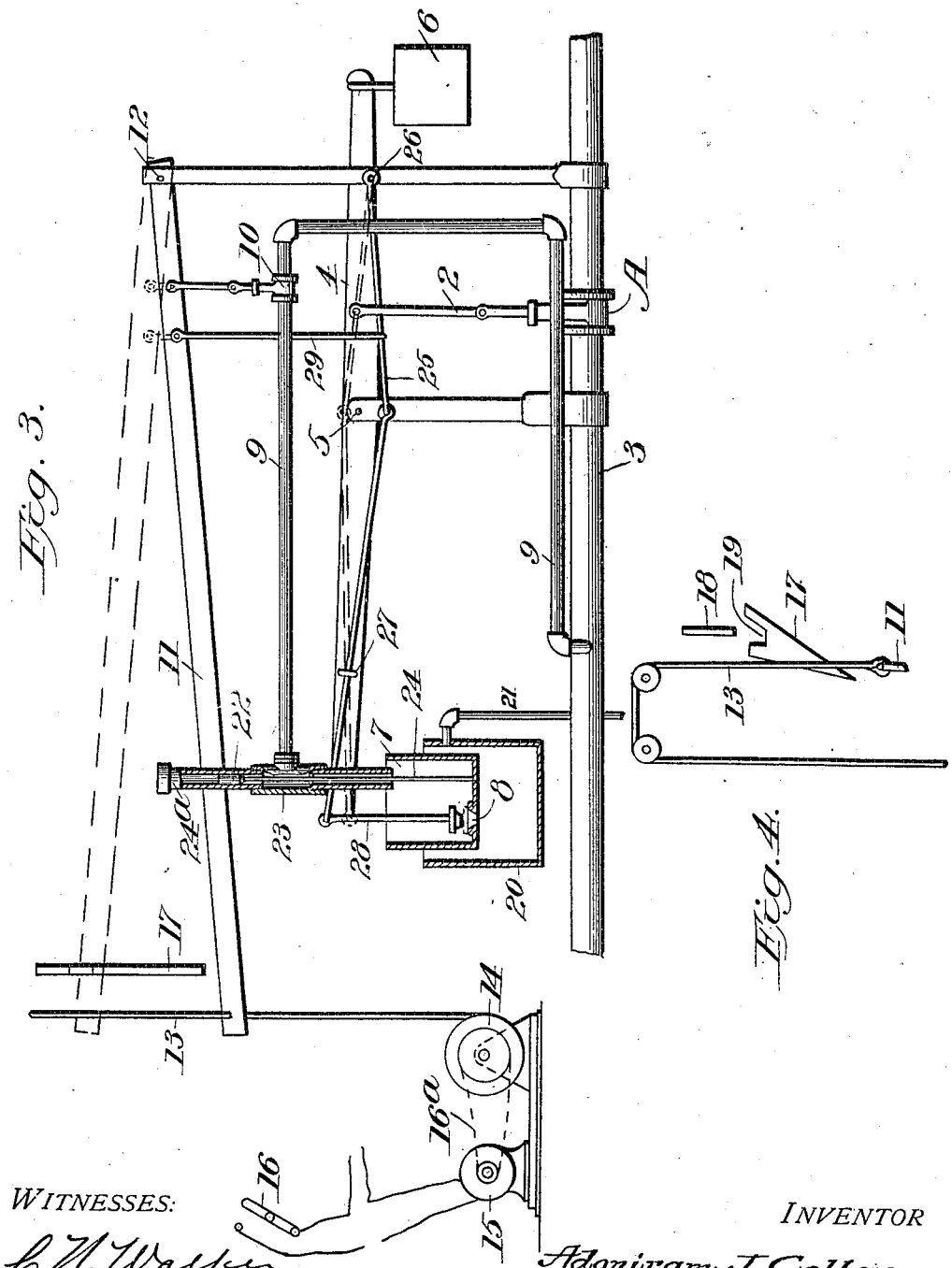

UNITED STATES PATENT OFFICE.

ADONIRAM J. COLLAR, OF YREKA, CALIFORNIA.

SYSTEM OF WATER CONTROL.

No. 838,384.          Specification of Letters Patent.          Patented Dec. 11, 1906.

Original application filed November 4, 1903, Serial No. 179,798. Divided and this application filed December 20, 1904. Serial No. 237,657.

*To all whom it may concern:*

Be it known that I, ADONIRAM J. COLLAR, a citizen of the United States, residing at Yreka, in the county of Siskiyou and State of California, have invented new and useful Improvements in Systems of Water Control, of which the following is a specification.

My invention relates to a system of water control, and is especially designed for use in conjunction with municipal water-supply systems and the like where the source of supply is situated at some distance above the level of the town.

In small towns of a few hundred or a few thousand inhabitants there is trouble frequently of a lack of water in case of an emergency, like a fire, and many small places have been destroyed by reason of the reservoir being dry when the emergency arose, most towns having a reservoir capable of holding at most only a few hundred thousand gallons. In a dry climate where for several months there is no rain the entire water-supply for the season must be stored in this reservoir, which fills up only when there is a heavy rainfall and during the dry season gradually becomes depleted. Some towns arrange for two or more reservoirs—one as a reserve to be drawn on in case of an emergency, like a fire, while the ordinary supply for the town is drawn from the other reservoir. The maintenance of two independent sources of water-supply is not only expensive, but disadvantageous for other reasons.

The essential object of my invention is to provide means for meeting the difficulties above alluded to by combining substantially two reservoirs in one, one above the other, but separated from each other by an imaginary plane, which is represented by the inlet to the pipe through which the ordinary supply to the town may be drawn without materially reducing the water in the reservoir below the level of said pipe, thereby retaining in the reservoir a certain definite amount of water for emergencies, and connecting the so-called "double" reservoir at a lower level with a pipe system and controlling devices, which are called into play when an emergency arises.

The invention consists of the parts and the construction and the combination of parts, as hereinafter more fully described and claimed, having reference to the accompanying drawings, in which—

Figure 1 is a general view of the apparatus for carrying out my invention. Fig. 2 is an enlarged sectional view showing the tank, float, and connected parts. Fig. 3 is an elevation, in partial section, of the means for operating the upper gate. Fig. 4 is a detail of the means for holding the operating-lever in raised position.

B represents the reservoir, from which leads the supply-pipe 3, in which is the main control-gate A. Having reference to Figs. 3 and 4, gate A has a stem 2, connected with a lever 4, fulcrumed intermediate of its ends at 5. The end of the lever adjacent to stem 2 is weighted, as at 6, so as to maintain the gate in normally closed condition. The opposite end of the lever carries a bucket or receptacle 7, having a valve 8 in its bottom. This receptacle is adapted to be alternately filled with water and emptied to effect an oscillation of lever 4 to open and close gate A. The filling of receptacle 7 is accomplished by the following means: A small pipe 9, having a control-valve 10 and leading from any suitable source of constant supply, is adapted to discharge into the bucket whenever valve 10 is opened. The stem of valve 10 connects with a lever 11, which is fulcrumed at one end, as at 12, and has its other end attached to a cord 13. The weight of lever 11 normally keeps valve 10 closed. Cord 13 is attached to a drum or shaft 14, operated by a small motor 15. The motor is set in operation by means of suitable connections with a source of energy and a switch, as 16, located at the point of control, which may be several miles from the reservoir or the controlled point. Suitable means are provided to limit the amount of cord 13 which shall be wound up, since it is only necessary to wind up the cord sufficiently to lift lever 11 and open valve 10. For that matter the drive-belt 16$^a$, connecting the motor and drum 14, may be made loose, so as to slip when a tension beyond that necessary to lift lever 11 is exerted. Assuming lever 11 to be depressed and valve 10 closed, an excitation of the motor causes cord 13 to wind up, lift the lever, and open the valve. Breaking the circuit allows the lever to fall by gravity, and if no stop is interposed in the path of lever 11 it will drop to its original position and close valve 10.

In Fig. 4 I have shown means for guiding and arresting the movement of the lever, so that one excitation of the motor will lift the lever, but on the circuit being broken it will be prevented from falling to close the valve, while on a second excitation of the motor the lever will be again slightly lifted and on breaking of the circuit will be enabled to return to its original depressed position. Accordingly I provide a guide 17, inclined relative to the plane of movement of lever 11 and in the path of the lever, against which the latter is adapted to ride on its upward course and to be slightly deflected to one side. On reaching the limit of upward travel the lever rides over guide 17; but in its tendency to swing back into normal vertical position it encounters a vertical guide 18, which has its lower end extending into a V-shaped notch 19. On the lever being released it drops into this notch, but the elevation of the lever is still such as to maintain valve 10 in open position. On the lever being lifted a second time it swings out of the notch and under guide 18 and on being released is free to fall to its original position beneath guide 17. The opening of valve 10 allows bucket 7 to fill, whereupon lever 4 is oscillated to open the main gate-valve A. In order to limit the rate of downward movement of the bucket and cause the valve A to open gradually, a tank 20 is disposed in the path of the bucket, which tank is adapted to be kept constantly filled with water, into which the bucket may descend, the displacement of the water in the tank relieving the several parts of any shock incident on a too rapid movement of the bucket. The surplus water from tank 20 is led off through an overflow-pipe 21. As the bucket is depressed to its lowest point and the gate A is opened to let water flow through main 3 the further flow of water from pipe 9 is discontinued, since it is only necessary to fill the bucket sufficiently to overcome weight 6, and the bucket will remain full so long as valve 8 remains closed. The shutting off of the water from pipe 9 is effected by a valve 22, operating in a T 23 on the end of the pipe and having its stem 24 connected with the bucket, so that when the bucket is depressed to its lowest point the valve will close, and when the bucket lifts the valve will open in readiness for the next filling of the bucket. The T 23 has an upward extension 24ª, corresponding approximately to the length of the bucket movement. This extension is closed at the end and forms a chamber for valve 22. Discharge from pipe 9 take place into the bucket through the lower end of the T, in which a suitable seat is formed for valve 22. By opening valve 8 the bucket may be emptied to allow the end of lever 4, carrying weight 6, to descend and close gate A. This emptying of the bucket is effected coördinately with the movement of the operating-lever 11 by the following means: 25 represents a toggle-lever having one member fulcrumed at 26 to a fixed point of support and the other member slidable in a guide 27 on lever 4. The free end of the toggle connects with valve 8 by a rod 28. The toggle being fulcrumed on lever 4 in guide 27 will partake of the same movements of lever 4, but in addition thereto will have a movement of its own to open or close valve 8. When the toggle is in extended position, valve 8 will be closed down on its seat. On breaking the toggle, so as to lift the end of the toggle intermediate of guide 27 and valve 8, the latter will be lifted to discharge the contents of the bucket into the tank. This breaking or depression of the toggle is caused by a link 29, having one end pivoted to the toggle intermediate of fulcrum-guide 27 and pivot 26, and the other end to operating-lever 11. When the latter is in normal depressed position and the gate A and valve 10 closed, the link will exert a pressure to bend the toggle and open valve 8. However, on the raising of lever 11 and during each period as it rests in notch 19 the link will lift on the toggle to close valve 8.

In operation if it is desired to turn the full head of water from the reservoir into the main below gate A switch 16 at central station is operated to excite the motor at the controlled point and allow bucket 7 to fill. On the depression of the latter gate A is opened. The actuation of switch 16 need be but momentary. The motor having lifted the operating-lever 11, the current is turned off and is not turned on again until it is desired to shut off the water in the main. A second actuation of the switch, followed shortly by the breaking of the circuit, causes lever 11 to fall to its normal position, depressing the toggle 25, opening valve 8, and discharging the contents of the bucket, whereupon lever 4 rises and closes gate A. Valves 10 and A are similar in construction, different only in size, and are preferably of the straight-way wedge-shape expansible type. The main 3 taps the bottom of the reservoir, and its gate A is open only in case of emergency. The ordinary supply to the town will come through an overflow-pipe or by-pass 3′, entering the reservoir at a suitable point above pipe 3 and connecting with the latter at some suitable point below gate A. It will be seen that by drawing the water from the ordinary supply of the town from a point above the outlet of the main 3 the water in the reservoir will not be reduced below the level of the outlet to pipe 3′ except when gate A is open. Consequently there will always be for fire purposes and like critical emergencies a certain definite amount or an excess of that certain amount of water in the reservoir represented by the height of the outlet to pipe 3′ above the outlet to pipe 3.

The pressure in the main at the point of delivery is regulated by means of an apparatus shown in Fig. 2. The reservoir may be situated at five hundred feet above the town, while this regulating apparatus is placed at one hundred feet or two hundred feet or such other elevation above the town as will produce sufficient pressure in the pipes for all ordinary purposes and uses. In case of fire or other emergency this regulating device will be thrown out simultaneously with the opening of gate A, so as to allow a full head under full pressure to flow through the main. When the emergency has passed, gate A will be closed and the regulator again cut in. The construction and operation of this pressure-regulating apparatus is as follows: This controllable pressure-regulator consists of a tank 39, of iron or other suitable material, having the water-main 3 passing through it from side to side, pipe 3 being perforated all along its lower side within tank 30 to allow the water to communicate freely between pipe and tank, yet not become turbulent, as it would if the perforations were at the top or sides of the pipe. Inside tank 39 is a float 40, which is weighted to half its carrying capacity or thereabout by means of the removable weights 41 on stem 42. This float is adapted to lift on the lever 43 and close the gate A' and must have weight also that it may pull down on the lever and open the gate when required. This float has a hollow stem 42, passing up through the neck of tank 39, leaving space enough around it to freely admit air to surface of water in the tank. The bottom of float inclines downward toward the center from all directions, the better to drain it when using the siphon. Stem 42 is long enough to allow the float to descend nearly to pipe 3, and when it does so in work hereinafter described the valve 44 on the stem seats on the end of neck 45 of the tank, so that the latter withstands all internal pressure, a suitable packing-ring being interposed between valve 44 and the end of neck 45 to prevent leakage. On the top of stem 42 is a cap 46, in the top of which is a circular opening 47, in which seats a float-valve 48, which falls down and hangs by its stem when the "pressure-regulator" is in ordinary use; but when in special use and full of water valve 48 floats up into the opening, closing the hole in cap 46 and preventing any leakage. Fitted into stem 42 and through side of cap 46 (with air-space in the stem, but air and water tight through the side of the cap) is a siphon-tube 49, with its outer leg extending down on outside of tank to a position lower than the bottom of the float 40, the inner leg nearly reaching the bottom of float and the outer leg being of brass tubing and sliding inside of and closely fitting a larger brass tube 50, which connects at its lower end with the small feed-pipe 51. Near the top of the stem 42 is joined a rod 52, which joins lever 43, which is supported on a standard 53. At the opposite and short end of lever 43 is attached a jointed rod, which descends to and operates the large gate-valve A'. A small feed-pipe 54 connects main 3 with pipe 51 for sending water into float 40 when required. This gate and its attachments are the same as feed device on the other part of control apparatus previously described except that this feed-pipe 54 and its continuation 51 are used to empty float 40—that is, the water is siphoned off from the float 40 through pipes 49 50 51 and discharged through an elbow 55 whenever valve 56, controlling the outlet of the elbow, is opened. Valve 56 has two small rods 57, running up through eyes on each side of the elbow and connecting with the stem of valve above the shell of valve 58, which governs the inlet from main 3 into pipe 54 and the float.

In operation the water in flowing through main 3 escapes through perforations 59 into tank 39 and operating through float 40 and its attachments keeps gate-valve A' in the proper position to control the flow of water. The pipe 3 above gate A' thus acts as a reservoir. Now tank 39 having its contents exposed to the open air through the space between the stem 42 of the float and the neck 45 of the tank, the water flows from the tank with only such pressure as the depth of the water in the tank produces, and the pressure in the distributing system will be only such as the elevation of the tank above town gives. By having an overflow-pipe 3' half way or more up the side of the large reservoir leading into the main below the gate-valve, as previously described, the water can pass through tank 39 at the proper elevation, take away its pressure, and pass it on to the city for every-day use. To throw this regulator out of service and get the full available supply from the large reservoir at the hydrants, the wire that leads to the reservoir-gate A is passed through a motor 60 at the regulator, and when the current begins opening the reservoir-gate A it also, through lever 61 and rods 57, opens feed-gate 58 and closes valve 56, causing the water to flow through pipe 54 and its continuations and fill float 40 with water, when the float goes to the bottom of the tank, throwing gate A' wide open, and thus causing float-stem 42 with its valve 44 to close the top of tank 39, thus sending the full pressure of the reservoir down through the distributing system. When the emergency has passed, this pressure-regulator must be thrown back into service at the same time that the gate-valve at the large reservoir is closed. To do this it is only necessary to empty the float of its water. When the lever 61 is dropped to close gate 58, it opens valve 56, which siphons the water from float 40, causing it to rise to the top of tank and soon to take up its work of controlling the pressure in the downstream end of pipe 3. When the float is only partially filled with water, valve 48 remains open and allows air to escape when filling the float and is only closed when the water rising in the hollow stem of float forces it against its seat. On starting to empty the float through the siphon valve 48 drops down and allows air-pressure to operate the siphon. Ribs and braces are placed inside the float to give it strength to endure whatever pressure it may encounter. Whenever the water-supply falls to the level of the inlet to pipe 3′, the inhabitants must resort to wells or some other source of supply, since the public safety takes precedence over individual comforts. It is only in case of fire that the gate A is opened and the entire contents of the reservoir rendered available.

From the foregoing it will be seen that I combine practically two reservoirs in one, one above the other separated only by an imaginary plane in which is the inlet to pipe 3′.

This application is a division of my original application, Serial No. 179,798, filed November 4, 1903, for an improved system of water control.

Having thus described my invention, what I claim, and desire to secure by Letters Patent, is—

1. The combination with a source of water-supply, of a discharge-main, a control-gate therein, a by-pass, connecting with the main below said gate and with the source of supply above said gate, a supplementary control-gate in the main below the junction of said main and by-pass, said main and by-pass connecting with the source of water-supply at different levels, and means for opening said gates simultaneously.

2. The combination with a water-supply and a discharge-main connecting with the lower portion thereof, of a plurality of gates in the main, at different levels, a by-pass connecting with the water-supply above the main, and connecting with the main intermediate of the gates, and means for automatically opening and closing the lower gate.

3. The combination with a water-main, of two gates located therein at different levels, a source of water-supply with which said main is connected, a pipe also connected with a source of water-supply and with the section of the main intermediate of the gates, the point of connection of said pipe with the water-supply being at a higher level than the point of connection of the main with the supply, means for operating both gates simultaneously and independent automatic means for opening and closing the lower gate.

4. The combination with a water-supply and a discharge-main, of two gates located in the main at different levels, a by-pass connecting the section of the main between the gates with the water-supply above the gates, the point of connection of said by-pass with the water-supply being at a higher level than the point of connection of the main with the water-supply, means controlled by the level of the water in the main below the gates to regulate the opening and closing of the lower gate, and electrically-operated means for operating the upper gate in unison with the lower gate.

5. The combination with a water-supply and a discharge-main, of two gates in the main at different levels, fluid connections between the source of supply and the section of the main between the gates and connecting with said source of supply at a point above the inlet end of the main, an automatic regulator mechanism for controlling the lower gate, means for maintaining the upper gate normally closed, and means for operating the two gates coördinately.

6. The combination with a water-supply and discharge-main, of two gates in the main, fluid connections between the water-supply and the main between the gates, said connections and the main connecting with the water-supply at different levels, means for maintaining the upper gate normally closed, and electrically-operated means for operating both gates coördinately to allow the full capacity of the reservoir to be utilized.

7. The combination with a water-main, of a gate therein and an automatic regulator for the gate, said regulator comprising a tank having constantly-maintained fluid connections with the main, a float in said tank, a lever connected with the valve-stem of the gate and from which lever said float is suspended, and means independent of the water in the tank to vary the level of the float to open the gate-valve.

8. The combination with a water-main, of a gate therein and an automatic regulator for the gate, said regulator comprising a tank having open fluid connections with the main, a normally buoyant receptacle in the tank, a lever connected with the gate-valve and carrying said receptacle, means for charging said receptacle to effect its submergence to open the gate-valve, and means to discharge the receptacle to permit the valve to close.

In testimony whereof I have hereunto set my hand in presence of two subscribing witnesses.

ADONIRAM J. COLLAR.

Witnesses:
S. H. NOURSE,
JESSIE C. BRODIE.